Sept. 20, 1932.　　　A. W. PHELPS　　　1,878,315
SIZING APPARATUS
Filed May 28, 1929
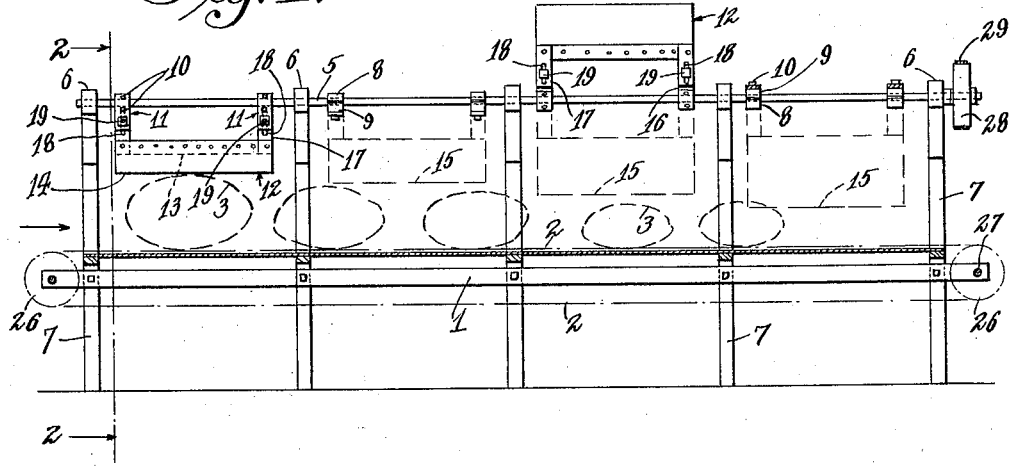
Fig. 1.
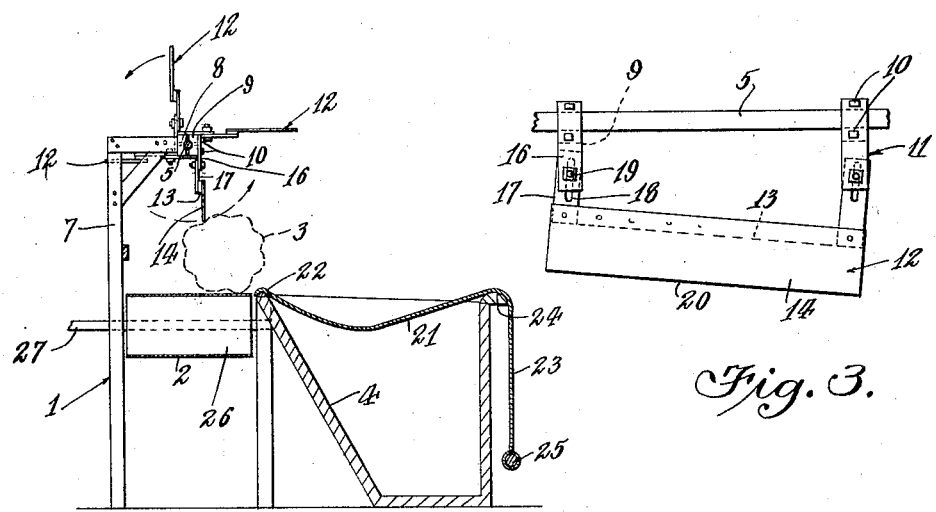
Fig. 2.
Fig. 3.
Inventor
Albert W. Phelps
By Lyon & Lyon
Attorneys Patented Sept. 20, 1932

1,878,315

UNITED STATES PATENT OFFICE

ALBERT W. PHELPS, OF LOS ANGELES, CALIFORNIA

SIZING APPARATUS

Application filed May 28, 1929. Serial No. 366,603.

This invention relates to sizing apparatus for effecting the distribution of fruit, melons or the like in different bins. While the invention may be applied to sizing apparatus for various purposes, it is especially useful when applied in apparatus of the type illustrated in my Patent No. 1,696,554, granted to me on December 25, 1928. The sizing device disclosed in the patent referred to involved the use of a flexible member or sheet disposed in an inclined position over a conveyor along which the fruit or melons move. By reason of the inclination of the sizer, the fruit was deflected off of the conveyor into a collecting bin. The general object of this invention is to provide sizing apparatus operating on the same general principle, but in which the deflecting force that throws the melon off of the conveyor is more positive in its action and operates so that it does not depend upon the speed of the conveyor.

A further object of the invention is to provide sizing apparatus of this kind which will operate to size fruit such as melons, without necessitating raising the center of gravity of the fruit as it passes off the conveyor.

Further object of the invention will appear hereinafter.

The invention consists in the novel parts and combination of parts to be described hereinafter, all of which contribute to produce an efficient sizing apparatus.

A preferred embodiment of the invention is described in the following specification, while the broad scope of the invention is pointed out in the appended claims.

In the drawing:

Figure 1 is a longitudinal section through the table and conveyor of a sizing apparatus embodying my invention, certain parts being broken away.

Figure 2 is a cross-section through the sizer, taken about on the line 2—2 of Figure 1.

Figure 3 is a side elevation showing one of the elements of the sizing apparatus and particularly illustrating a means for enabling the same to be adjusted at will.

In practicing the invention I provide a flat conveyor belt for advancing the melons in single file, commonly known as Indian file. The fruit rests on the upper face of this belt, and as it advances it passes a plurality of movable ejectors or sizing means which move in a path substantially at right angles to the plane in which the fruit or melons advance. These ejector devices are constructed or adjusted so as to roll the fruit of different sizes from the conveyor laterally into bins corresponding to the different sizes.

In the embodiment of the invention disclosed in the following specification, the apparatus includes a substantially horizontal or slightly inclined table 1 along which a conveyor such as an endless belt 2 moves, said belt operating to carry fruit such as melons 3 delivered to the same with the longitudinal axes of the fruit extending in the general direction of travel of the table. This feature of the invention particularly adapts it to be employed in conjunction with the apparatus disclosed in my prior patent referred to above, which employs a feed table divided by longitudinal rails into runways in which the melons may be placed by operators. These runways are narrow and will hold the melons with their longitudinal axes substantially in alignment with the direction of advance of the fruit.

Alongside of the conveyor I provide a plurality of collecting means such as bins 4. Opposite each bin 4 I provide a sizing device which includes a flexible member that moves across above the path of the fruit in such a way as to engage the upper side of the fruit and roll it off of the conveyor into a bin. These devices are mounted so that their lower edges are at different heights above the conveyor, that is to say, above the table 1. Any suitable construction may be employed for projecting the ejecting element in a lateral direction with respect to the direction movement of the fruit. I have illustrated a simple construction for this purpose involving the use of a longitudinal shaft 5 mounted to rotate in suitable bearings 6 supported on posts 7, directly over the conveyor. This shaft supports a paddle or ejector corresponding to each bin.

Each individual sizer or ejector is mounted on the shaft by means of a block of wood consisting of two sections 8 and 9 that are clamped together by clamping bolts 10. There is a pair of these blocks corresponding to each individual sizer and on each block I attach arms 11 that support an ejector paddle 12, said paddle preferably consisting of a longitudinal bar 13 having a flexible sheet or wiper 14 secured to it and projecting downwardly. These wipers 14 are formed of light sheet rubber, leather, or similar flexible sheet material, that is capable of exerting sufficient force upon the melon to roll it into the bin and which will operate without injuring in any way the skin of the fruit. This is important because the tendency to decay is greatly enhanced by injuries to the skin of the fruit.

As illustrated in Figure 1, the sizer, which is disposed at the extreme left end, is intended to eject the fruit of larger size and it will pass smaller fruit, which is ejected by the other sizers which are located toward the delivery end of the apparatus. These sizers toward the right are adjusted into a graduated arrangement so that the smallest fruit will be ejected by the sizer located at the extreme right.

There is only one paddle corresponding to each bin though more could be employed, if desired. In order to balance the shaft in its rotation, I prefer to place the paddles 90° apart. In Figure 1 the dotted lines 15 indicate the positions of the ejecting paddles toward the right as they sweep at the bottom of their stroke across the space above the conveyor.

In order to enable the sizers to be readily adjusted, I prefer to construct the arms 11 as illustrated in Figure 3, so that they include a main arm, 16, attached to the block, and an extension arm, 17, carrying the flexible wiper. One of these arms or extensions may be provided with a slot 18 with which co-operates a bolt 19 enabling the extension arm to be secured in a more or less extended position. This construction also permits, if desired, the wiper 12 to be supported in an inclined position instead of a horizontal position. In other words, in a position with its lower edge 20 inclined toward the plane of the conveyor belt. In the operation of the sizer paddles the fact that the edge of the belt is unobstructed enables them to roll the fruit over the edge of the belt without raising it.

In order to prevent injury to the fruit, such as melons, as they roll into the bins, I provide a flexible apron 21 (see Figure 2) which is attached at its inner edge 22 to the inner edge of the bin and which sags down so as to form a false bottom for the bin. The outer edge of the apron hangs down as a curtain 23 over a rounded polished sill 24, the hanging end of the curtain carrying a bar 25 to act as a kind of counter-weight and which can rise as the fruit accumulates in the bin.

The end of the conveyor belt 2 passes around rollers 26, one of which may be carried on a driven shaft 27. The shaft 27 may be driven by a belt pulley and belt (not illustrated).

The shaft 5 may be rotated at a speed corresponding to the speed of the conveyor 2. This shaft 5 may be rotated at such a speed by means of a belt pulley 28 and belt 29 (see Figure 1).

It is understood that the embodiment of the invention described herein is only one of the many embodiments this invention may take, and I do not wish to be limited in the practice of the invention, nor in the claims, to the particular embodiment set forth.

What I claim is:

1. In sizing apparatus for melons or the like, the combination of a conveyor for advancing the melons along a path in single file, a plurality of rotary sizers located over the conveyor, each sizer comprising a pair of arms rotating on an axis above the conveyor, a bar connecting the arms with means for adjusting the bar, said bar having a flexible member attached thereto for engaging the upper side of the melons to roll the same off of the conveyor.

2. In sizing apparatus for melons or the like, the combination of a conveyor for advancing the melons, a plurality of rotary sizers disposed over the conveyor and rotating in a plane substantially at right angles to the direction of advance of the conveyor, said sizers having arms disposed radially from the axis of rotation with flexible members in the form of sheets of yielding material with their outer edges projecting in radial planes outwardly beyond the ends of the arms for engaging the melons and with their outer edges disposed at different distances from the conveyor as they pass over the same, said flexible members operating to roll the melons and thereby eject the same from the conveyor, and means at the side of the conveyor for catching the melons substantially as described.

Signed at Los Angeles, California this 21st day of May, 1929.

ALBERT W. PHELPS.